Patented Dec. 9, 1930

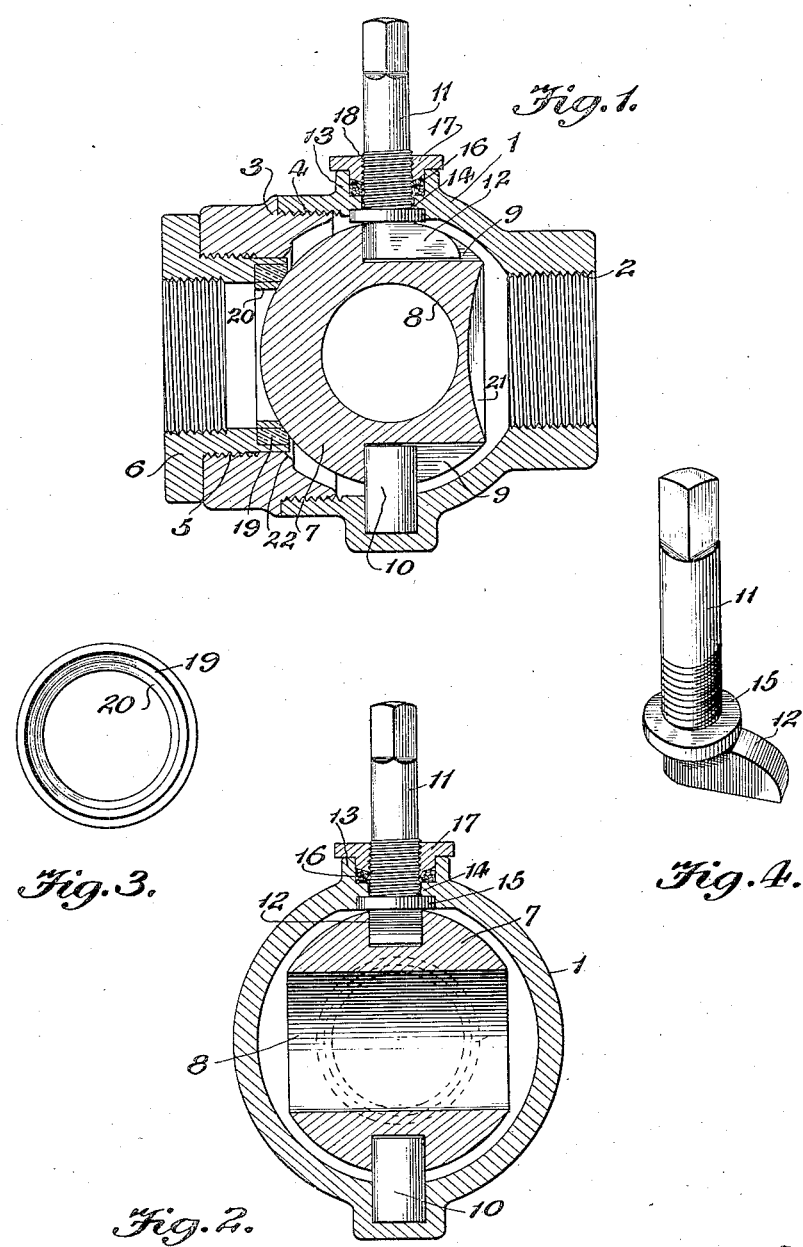

1,784,381

UNITED STATES PATENT OFFICE

FRANK J. O'STROSKE, OF COLUMBUS, OHIO

VALVE

Application filed November 28, 1927. Serial No. 236,289.

The present invention relates to valves and while it involves features which are of general application so far as valves are concerned, it has special reference to valves of the type disclosed in my Patent #1,616,386, granted February 1, 1927.

An objectionable feature of many, if not all valves, is that the seats for the valve head wear away very rapidly and thus require the repair of the valve or the installation of a new one. Among other disadvantages of valves as now constituted, are leakage around the valve stem; a tendency for the valve head to move from its seat due to the absence of any means for positively holding the head against its seat; and also the fact that in order to repair or renew the seat for the valve head it is necessary to remove and entirely dismantle the valve.

Accordingly it is an object of the present invention to provide in combination with the valve seat, a means for removing the scale from the valve head so as to avoid excessive wear on the seat.

Another object of the invention resides in the provision of means by which leakage about the valve stem is prevented, as well as means for causing a substantial pressure of the valve head upon its seat when in closed position so as to prevent accidental movement of the head away from its seat.

A further object of the invention consists in the provision of means by which the valve seat may be removed for the purpose of repair or renewal without removing the valve from the fluid system and without dismantling the valve, thereby avoiding the necessity of shutting off the fluid supply back of a leaky valve in order to repair the same.

Another object of the invention resides in the provision of a valve in which the valve seat may be removed for the purpose of repair or renewal and in which the parts are so designed as to automatically lock the valve head in sealing position when the valve seat is removed.

Other objects and advantages of the invention will be apparent from the following description when taken in connection with the accompanying drawing; in which Figure 1 is a vertical longitudinal section through the improved valve.

Figure 2 is a transverse section through the valve.

Figure 3 is an elevational view of the valve seat and scraper.

Figure 4 is a perspective view of the valve stem.

Referring to the drawings more in detail, the numeral 1 indicates the major portion of the valve casing which is provided with a threaded intake port or opening 2 to which may be threaded an inlet pipe. The secondary portion of the valve casing is designated by numeral 3 and is threaded as indicated by numeral 4 to the end of casing section 1 which is remote from the inlet port 2. This casing section 3 is also provided with a threaded opening 5 which serves as an outlet port and in which is received an internally threaded bushing 6 to which may be attached the usual outlet pipe or conduit. The interior of casing section 1 is of substantially semi-spherical form while the interior of the section 3 is more or less elongated so that when the two sections are combined when in use the interior of the casing is of substantially ellipsoidal form and has its major axis extending through the center of the inlet and outlet ports. The function for this particular design of the interior of the valve casing will be described hereinafter in connection with the operation of the valve head and seat.

The valve head which is indicated by numeral 7 is of substantially spherical form and is provided with an opening 8 extending therethrough for the passage of fluid when the valve head is moved to open position. This head is mounted for both rotary and reciprocatory movement and to this end the top and bottom of the valve head are provided with slots 9—9 which are closed at their ends which are closest that portion of the valve head which cooperates with the seat and which are open at their opposite ends. A pivot pin 10 is fixed in the bottom of casing 1 and has its upper end received within the lower slot 9, while the upper end of the valve head is connected to a valve stem 11 by means of the elongated head 12 which is positioned within the upper slot 9 of the valve head.

The valve casing 1 is provided with an upwardly extending gland 13 which has formed on the interior thereof an annular shoulder 14 for cooperation with a similar shoulder 15 formed on the valve stem 11. Suitable packing material 16 may be disposed within the gland 13 and is pressed into position by means of a bushing 17 threaded to the valve stem 11 as indicated by numeral 18. By threading the bushing 17 to the valve stem as indicated, the shoulder 15 of the valve stem is drawn up against the shoulder 14 and the packing 16 is forced into position around the stem thereby providing an exceedingly effective leak-proof joint as well as securing the stem in its cooperative relation with the other parts of the mechanism.

On the inner end of the bushing 6 is permanently mounted a non-metallic packing ring 19 which has its inner end curved on a radius from the center of the valve head 7 and serves as a seat for the valve head. Also mounted on the inner end of the bushing 6 and in frictional contact with the inner cylindrical surface of the valve seat or packing ring 19 is a scale breaker ring 20 formed of metal or other hard substance which serves to remove scale and other foreign matter from the valve head so as to avoid excessive wear on the valve seat 19 and thus greatly prolong the life of the seat as well as to maintain the effectiveness of the seal.

On the side of the valve head 7 remote from that portion thereof which cooperates with the valve seat 19 is provided a concaved face 21 which in conjunction with the fluid pressure on this side of the valve head will serve to center the head with respect to the casing and will, when the valve is in closed position, cause the necessary rectilinear movement of the valve head to press it firmly against its seat 19, thereby preventing accidental movement of the valve head after it has been moved to closed position.

The section 3 of the valve casing is also provided with what may be termed an auxiliary seat 22 which is constructed as an integral part of the casing. This seat 22 is concentrically disposed with reference to the seat proper 19 and is arranged adjacent thereto for a purpose which will now be described.

As hereinbefore stated, one of the objects of the present invention is to provide a valve in which the seat may be renewed or repaired without the necessity of closing off the entire fluid system and without entirely dismantling the valve itself. It is for this purpose that I have provided the auxiliary seat 22 which cooperates with the valve head 7 when the bushing and valve seat 19 are removed for repair. This advantageous result is accomplished, of course, by reason of the rotary and reciprocatory mounting for the valve head 7; it being apparent that when the valve head is moved to closed position as depicted in Figure 1 it may be moved to the left when the bushing 6 is removed, so as to engage the auxiliary seat 22; this movement being effected by fluid pressure on the side of the valve head in which the concaved face 21 is formed, the open ended slots 9 permitting the head the necessary freedom to move over against the auxiliary seat.

In operation, it will be apparent that the valve may be opened by turning the head 7 in either direction through an angle of 90° so as to bring the passage 8 of the valve head into alignment with the inlet and outlet ports 2 and 5. The valve may then be closed by turning the head in the opposite direction through the same angle. An effective seal of the valve head when in closed position is afforded by reason of the reciprocatory mounting for the valve head and the concaved face 21 by means of which pressure in the fluid system causes a rectilinear movement of the head so that it will firmly engage the valve seat 19. Wear on the non-metallic seat 19 is reduced to a minimum by reason of the scale breaker or scraper 20 which is formed of relatively hard material and which thus eliminates to a great extent unnecessary wear on the seat by reason of foreign matter collecting on the spherical surface of the head. As the valve seat wears down through use of the valve the scraper or scale breaker 20 is automatically moved backward so as to cause its forward or active edge to remain flush with the seat 19.

After the valve seat is worn to the extent that it should be repaired or replaced, it is only necessary to move the valve head 7 to the position shown in Figure 1 and then remove the bushing 6 for the purpose of supplying a new seat 19. As soon as the bushing 6 is removed it will be obvious that due to the provision of the open ended slots 9, and the oval shape of the interior of the casing, the head 7 will, due to the fluid pressure on the concaved face 21, move to the left (Fig. 1) so as to engage the auxiliary seat 22 and thus temporarily close the valve until a new seat has been placed in the end of the bushing 6. After the seat has been secured in the bushing 6 it is only necessary that the bushing be screwed into the casing section 3 so as to bring the seat back to its normal position with respect to the casing and simultaneously force the valve head 7 to the right (Fig. 1) against the fluid pressure on the concaved face 21, thereby restoring all parts of the valve to their normal operative positions.

From the foregoing description it will be apparent that I have devised an exceedingly simple construction of valve which is so designed as to provide a leak-proof joint of the valve stem with the casing; that due to the provision of the auxiliary valve seat the main seat may be readily removed for repair or replacement without closing of the main fluid system and without dismantling the valve; and that provision is also made by which wear on the valve seat is reduced to a minimum.

In accordance with the patent statutes I have described what I now believe to be the best embodiment of the invention but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A valve including a casing provided with two internal seats at one end thereof, and a valve head in said casing mounted for rotary and reciprocatory movement, one of said seats being normally inoperative.

2. A valve including a casing provided with two concentrically arranged internal seats at one end thereof, a valve head provided with a curved surface for cooperating with either of said seats, and means for mounting said head for rotary and reciprocatory movement, one of said seats being normally inoperative.

3. A valve including a casing provided with two internal seats adjacently arranged at one end thereof, and a valve head in said casing mounted for rotary and reciprocatory movement, said head provided with a passage extending therethrough, one of said seats being normally inoperative.

4. A valve including a casing provided with inlet and outlet openings, two adjacently arranged internal seats formed in said casing contiguous said outlet opening, and a valve head mounted for rotary and reciprocatory movement, one of said seats being normally inoperative.

5. A valve including a casing provided with inlet and outlet openings, a fixed seat in said casing, a removable seat mounted adjacent thereto, and a valve head mounted for rotary and reciprocatory movement, one of said seats being normally inoperative.

6. A valve including a casing provided with inlet and outlet ports, a fixed seat in said casing, a removable seat mounted adjacent thereto, a valve head provided with a passage extending therethrough, and means for mounting said head for rotary and reciprocatory movement, one of said seats being normally inoperative.

7. A valve including a casing provided with an integrally-formed, circular seat, a circular, removably-mounted seat of smaller diameter than said first-mentioned seat, a valve head provided with a curved surface of sufficient dimensions to engage either of said seats, and means for mounting said head for rotary and reciprocatory movement, one of said seats being normally inoperative.

8. A valve including a casing provided with aligned inlet and outlet ports, the interior of said casing being of ellipsoidal form and having its major axis passing through said ports, a removable valve seat in said casing, and a substantially spherical valve head mounted within the casing for rotary and reciprocatory movement, whereby when the seat is removed the substantially spherical valve head will be automatically moved longitudinally of the ellipsoidal casing so as to be locked therein.

9. A valve including a casing provided with inlet and outlet ports, a rotary valve mounted therein, a circular removably-mounted seat adjacent the outlet port, a second seat arranged in the casing, said second seat being inoperative when the first-mentioned seat is engaging the valve.

FRANK J. O'STROSKE.